H. TÖDT.
STERILIZER.
APPLICATION FILED DEC. 9, 1913.
1,093,500.
Patented Apr. 14, 1914.
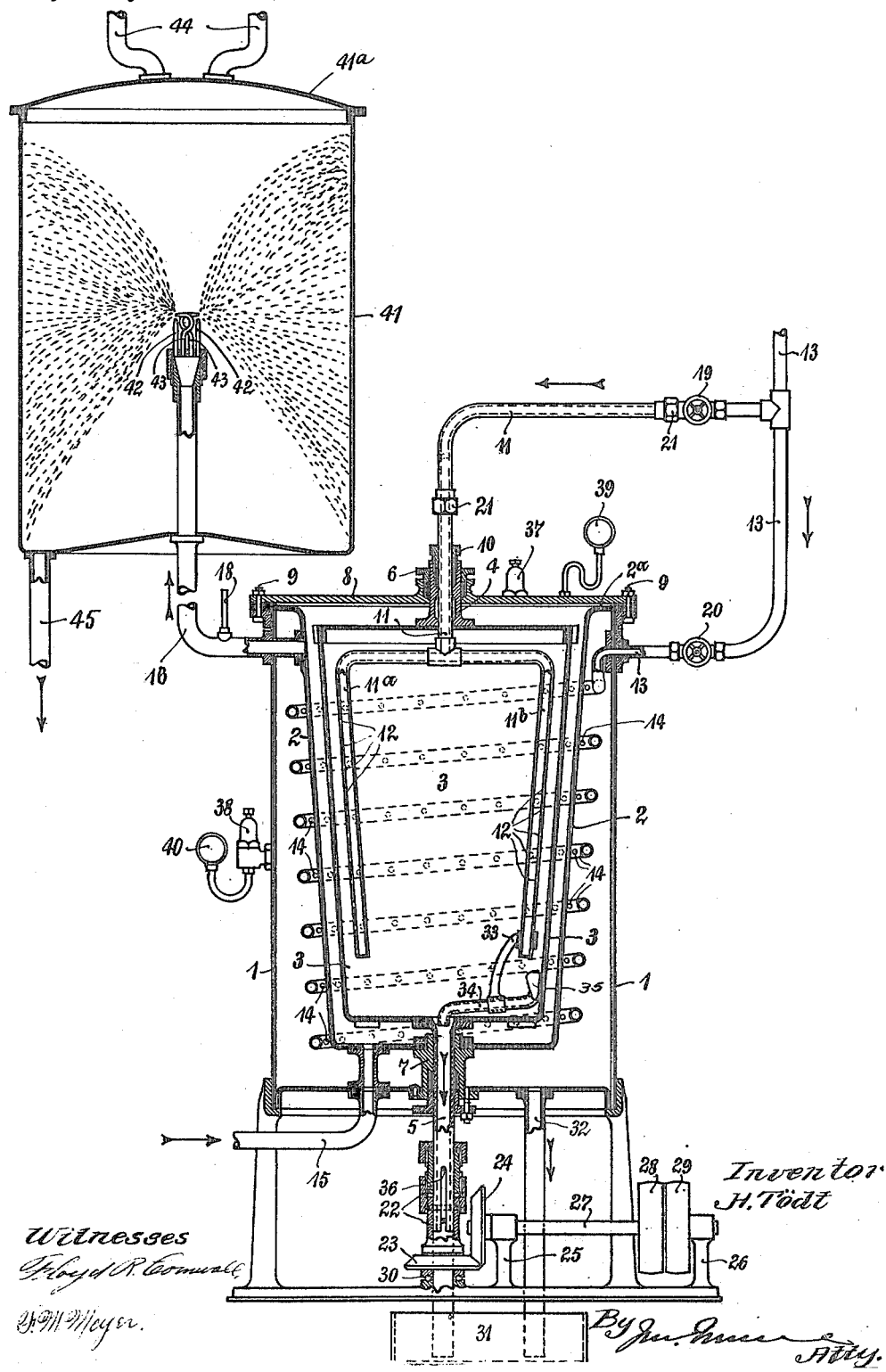
Witnesses
Inventor
H. Tödt

UNITED STATES PATENT OFFICE.

HEINRICH TÖDT, OF LENSAHN, GERMANY.

STERILIZER.

1,093,500.  Specification of Letters Patent.  Patented Apr. 14, 1914.

Application filed December 9, 1913.  Serial No. 805,619.

*To all whom it may concern:*

Be it known that I, HEINRICH TÖDT, a subject of the German Emperor, residing at Lensahn, Holstein, Germany, have invented new and useful Improvements in or Relating to Sterilizers, of which the following is a specification.

This invention relates to an apparatus for use in pasteurizing cream, milk and other like fluids.

It is the object of the invention to effect the pasteurization more expeditiously and in a more efficient manner than heretofore.

The apparatus comprises a conical vessel, and a drum of similar form within said vessel, the drum being rotated while the vessel is stationary. Between these two members a space is left through which the fluid to be pasteurized is caused to pass. The stationary conical vessel forms the inner wall of a double-walled container to which a heating medium is admitted. Means are provided also for introducing a heating medium into the interior of the revolving drum, and for carrying away the condensed fluid, for instance water if steam is used for heating.

According to this invention the heating medium such as steam, is introduced into the space between the stationary conical vessel and its container, and into the interior of the revoluble drum, by means of pipes with apertures which direct the heating medium against the outer wall of the stationary conical vessel and against the inner wall of the revolving drum. In this way the walls are very effectively heated, and the fluid to be pasteurized is caused to be heated to substantially the same temperature as that of the heating medium used, which may be for instance 130° or 140° centigrade in the case of steam under pressure.

The fluid such as milk or cream, after being highly heated in the apparatus as described, passes out from the same and into a chamber or vessel wherein it is broken up or distributed in the form of a fine spray. The milk, cream or other fluid which has been sprayed and thus completely broken up, is collected and carried away from the chamber or vessel, and ultimately cooled as may be required. Any known form of cooling apparatus may be used for this purpose, and it forms no part of the present invention.

The invention is illustrated in the accompanying drawing, wherein the apparatus is shown in vertical section.

The container 1 is preferably of cylindrical form, and the stationary conical vessel 2 is supported therein; the revoluble drum 3 is arranged inside the vessel 2. This drum has a tubular member 4 at the top and a pipe 5 at the bottom communicating with the same, and forming at the same time the supporting axis for the drum. The members 4 and 5 work in stuffing boxes or packed bearings 6 and 7. The stuffing box 6 is arranged in the cover 8 of the vessel 2, this cover being secured by bolts 9 to a flange 2ª of the vessel 2 and to a flange at the top of the container 1, while packing rings are inserted between said cover and flanges to make the joints steam-tight. The lower stuffing box 7 forms the connection between the container 1 and vessel 2 at the bottom.

The pipe 11 enters the drum at the top through the tubular member 4, and a gland 10 fitting therein. The pipe is divided into a plurality of stationary arms 11ª, 11ᵇ inside the drum, these arms extending close to the wall of the drum and being formed with apertures as at 12, which are outwardly directed. A pipe 13 enters the container 1 and is carried in a spiral form around the vessel 2, being formed with holes at 14 for directing the heating fluid against the outer surface of the wall of the said vessel.

The fluid to be pasteurized, such as milk or cream is introduced into the vessel 2 from below through the pipe 15; the fluid being fed by a suitable pump through the said pipe. After being pasteurized the fluid leaves the vessel 2 at the top thereof through a pipe 16 having a thermometer 18 therein for indicating the temperature. The pipe 16 leads to a chamber or vessel 41, and is provided at its end inside the said vessel with one or more spraying nozzles which may be of any suitable form. Preferably these nozzles are of the type as shown, each consisting of a pair of pipes 42 and 43 whose openings are directed across one another, so that the streams of liquid issuing from the same impinge one against the other, whereby the liquid is converted into finely divided spray. The removable cover 41ª of the vessel 41 is provided with one or more pipes 44 through which the mist and steam produced during the spraying operation can be drawn off. From the bottom of the vessel 41, a pipe 45 leads away to a cooling apparatus of any suitable type (not shown).

Steam pipes 11 and 13, the one being branched from the other, have cocks 19 and 20 therein for controlling the supply of the steam used for heating purposes. Couplings are provided at 21, in order to permit of the removal of the portion of the pipe 11 between the cock 19 and the gland 10. The pipe member 5 which serves as a lower axis for the drum 3 is supported in an adjustable bearing constituted by the tubular member 22 in order that it may be raised and lowered so as to vary the height of the drum, and to increase or reduce the space between the conical walls of the vessel 2 and of said drum. When the drum 3 is raised or lowered the number of the packing rings or the like inserted between the flange 2ª of the vessel 2 and the cover 8 is also increased or reduced, in order to raise or lower the cover 8 to a corresponding extent. On the lower part of the tubular member 22 is mounted a bevel wheel 23 gearing with a wheel 24 mounted on a shaft 27 which is carried in supports 25 and 26. The shaft is driven by a belt for instance, working on fast and loose pulleys 28 and 29. A toothed wheel 23 attached to the tubular member 22 turns upon a ball-bearing 30, and the passage through the same extends downwardly into a condensing vessel 31. A pipe 32 leading out from the bottom of the container 1, also terminates in the condensing vessel 31.

Close to the end of one of the stationary perforated pipes 11ª, 11ᵇ, is attached an arm 33 carrying a radial pipe 34, at the outer end of which a scoop 35 is formed, while its inner end projects into the pipe 5. The scoop 35 catches the condensed water which is thrown against the circumference of the drum owing to its rotation, and it conducts this water into the pipe 5, which latter is connected with the pipe member 22 through a longitudinally adjustable and detachable coupling 36. The drum 3 and vessel 2 are of such relative sizes that a narrow space is left circumferentially between their walls, and also between them at the top and bottom, so that only a comparatively small amount of liquid can be passing through the vessel 2 at any time. The steam ejected through the holes 12 and 14 of the pipes 11ª, 11ᵇ and 13 strikes against the walls of the drum 3 and vessel 2, and results in the heating to a high temperature of the liquid in contact with these walls. The outer walls of the drum 3 are made smooth so that they cannot become coated with fatty material separated from the cream passing therethrough.

By means of the new heating device as above described, the heat of the steam is very effectively used, while a comparatively small amount of steam is employed. Safety valves 37 and 38, and pressure gages 39 and 40 are provided in order to prevent excessive steam pressure, or to indicate when the pressures are becoming excessive in the drum 3 and container 1.

Having thus described my invention, what I claim as new and desire to secure by Letters Patent is:—

1. In an apparatus for use in pasteurizing liquids, the combination with a stationary vessel and a revoluble drum arranged inside the said vessel so as to leave an intervening space, and means for revolving the drum, of means for conveying a heating fluid to the surfaces of the walls of the vessel and drum, said means comprising a pipe disposed in coils around the vessel and formed with perforations on the side adjacent to said vessel, and a second pipe with means for carrying the same through one end of the revolving drum, said second pipe being disposed adjacent to the inner surface of the wall of the drum, and formed with perforations on the side adjacent to said wall.

2. In a pasteurizing apparatus, the combination with a container, a conical stationary vessel therein, a conical drum smaller than said vessel and fitting within the same so as to leave an intervening space, means for rotating the drum and bearings for supporting the same, of a plurality of perforated hollow members and means for supplying a heating medium thereto, said perforated members being disposed respectively adjacent to the outer surface of said vessel and to the inner surface of said drum, and means for carrying away the cooled heating medium from within the drum and from the container.

3. In an apparatus for pasteurizing liquids, the combination of a double-walled vessel whose inner wall is conical in form, a conical revoluble drum adapted to fit in said vessel so as to leave a space between said drum and the conical wall of the vessel, and closing means for the top of said vessel, with bearings for supporting the drum at its ends, means for revolving said drum at high speed, means for adjusting the height of said drum in the vessel for the purpose of varying the volume of the space between the circumferential walls of the drum and the conical surface of the vessel, perforated hollow members disposed in the vessel and in the drum respectively adjacent to the conical walls thereof, and means for conveying a heating fluid thereto for the purpose of heating said walls.

4. In a pasteurizing apparatus the combination of a double-walled vessel, a revoluble drum disposed within the same, means for rotating said drum and for supporting the same at its ends, pipes for conveying a heating fluid into the double-walled vessel and into the interior of the drum respectively, said pipes having perforations therein directed toward the conical walls, means for supplying steam to said pipes, and means for removing condensed water comprising a pipe leading away from the double-walled vessel, a pipe leading away from the lower end of said drum through its lower bearing, a scoop for conveying the liquid from the inner surface of the drum to said latter pipe, and an arm supporting said scoop from a portion of the pipe which supplies the steam to the interior of the drum.

5. In a pasteurizing apparatus, the combination of a stationary receptacle, a rotating drum within and spaced from the walls of the stationary receptacle to form a milk passage, means for introducing milk at the bottom of the milk passage, means at the upper end of the milk passage to carry off the pasteurized milk, means for rotating the drum, a plurality of perforated pipes in the drum to introduce steam to heat the walls of the drum, a drain at the bottom of the drum, a pipe communicating with the drain and having at its outer end a flared mouth to engage the inner wall of the drum to carry off the condensed steam, and means including a coil around the stationary receptacle to heat the latter.

In testimony whereof I have signed my name to this specification in the presence of two subscribing witnesses, this 27th day of November 1913.

HEINRICH TÖDT.

Witnesses:
　FREIDR. JULIUS POTHS,
　ERNEST H. L. MUMMENHOFF.